United States Patent
Yamashita et al.

(10) Patent No.: US 7,094,452 B2
(45) Date of Patent: Aug. 22, 2006

(54) ANTIREFLECTIVE MEMBER AND ELECTRONIC EQUIPMENT USING SAME

(75) Inventors: Hiroshi Yamashita, Ichinomiya (JP); Yoshiaki Maeno, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/390,044

(22) Filed: Mar. 18, 2003

(65) Prior Publication Data
US 2003/0180476 A1     Sep. 25, 2003

(30) Foreign Application Priority Data
Mar. 25, 2002    (JP)    .............................. 2002-083902

(51) Int. Cl.
*B29D 11/00*    (2006.01)
(52) U.S. Cl. ..................... 428/1.3; 428/141; 359/619; 359/639; 359/640; 264/1.36; 264/1.38; 264/2.5
(58) Field of Classification Search ................. 428/1.3, 428/141; 349/619–640; 359/619–640; 430/1; 264/1.36, 1.38, 2.5
See application file for complete search history.

(56) References Cited

U.S. PATENT DOCUMENTS

| | | | | |
|---|---|---|---|---|
| 4,863,829 A | * | 9/1989 | Furuta et al. | ............... 430/192 |
| 5,473,594 A | * | 12/1995 | Miyazawa | ............. 369/112.03 |
| 5,683,595 A | * | 11/1997 | Nagamachi | ............ 204/192.34 |
| 5,695,894 A | * | 12/1997 | Clube | ............................. 430/1 |
| 5,817,396 A | * | 10/1998 | Perlo et al. | ................. 428/141 |
| 5,822,036 A | * | 10/1998 | Massie et al. | .............. 351/219 |
| 6,175,442 B1 | * | 1/2001 | Booth et al. | ................. 359/290 |
| 6,326,723 B1 | * | 12/2001 | Raj et al. | ..................... 313/461 |

OTHER PUBLICATIONS

Al Kelly, "What is a CCD camera and how does it work?", Retrieved on Jul. 23, 2004 from the Internet: URL <http://www.ghgcorp.com/akelly/ccdbasic.htm>.*

* cited by examiner

*Primary Examiner*—Harold Pyon
*Assistant Examiner*—Sow-Fun Hon
(74) *Attorney, Agent, or Firm*—Arent Fox PLLC

(57) ABSTRACT

An antireflective member with stability and a low reflectance at low cost may be provided by performing an antireflective treatment to a substrate in a molding process of the substrate. A roughened surface with a continuous pattern in a fine pyramidal shape is formed on a surface of a transparent substrate, the roughened surface is a diffraction surface with zeroth-order diffraction to visible light, and the pattern of the roughened surface is transferred from a mold at a transfer rate of not less than 70%.

17 Claims, 14 Drawing Sheets

ANTIREFLECTIVE MEMBER AND ELECTRONIC EQUIPMENT USING SAME

BACKGROUND OF THE INVENTION

1. Field of the Invention

This invention relates to an antireflective member used in various optical devices such as a spectroscopic analysis, optical electronics, optical communications and lighting equipment and suitably used to prevent light having wavelengths in the visible range from reflecting.

2. Description of Prior Art

Conventional optical elements using transparent substrates such as glasses and plastics are subjected to a surface treatment, for example an antireflective film provided on a light incident surface of the substrate, in order to reduce the amount of light reflected from the surface. A multilayered film with thin dielectric films deposited is well known as the antireflective film for light of wavelengths in the visible range. Such a multilayered film is formed by growing thin films of metal oxides etc. on a surface of a transparent substrate by means of a vacuum evaporation method or the like.

Another technique of the surface treatment to prevent reflection is to roughen the surface of the optical element finely and densely. When light passes through the surface of the optical element on which roughness is regularly provided, generally light diffraction occurs, thereby significantly reducing straight component of the transmitted light. However, roughness whose pitch is shorter than a wavelength of light transmitting therethrough may not cause the light diffraction. If the roughness is made, for example, in a rectangular shape as described later, excellent antireflective effect can be obtained for light having a single wavelength corresponding to the pitch, depth or the like of the roughness.

If the roughness is in the shape of peak and valley rather than rectangular, in other words, if the roughness takes the shape of a pyramid in a manner which continually changes a ratio between a volume of the optical element member side and a volume of the air side, an excellent antireflective effect can be obtained for even light having a wide wavelength range.

An example of a method to form such a roughness is cited in JP 88001/1993A. In the disclosure, an alcohol solution of ethyl silicate blended with particles of silicon oxide or aluminum oxide is coated over a surface of the required optical element. A film with roughness can be obtained after removing the particles.

JP 96902/1987A discloses another method. A surface of a molding tool is worked with the dense sawtooth shapes (also included are sawtooth shapes with rounded edge) at the prescribed depth from the depth of ⅓ wavelength of visible rays up to 1/50 and the plastic is molded by using the finished molding tool.

In the above method to form the antireflective film consisting of the dielectric thin films on the surface of the optical element, however, it is difficult to obtain the antireflective effect for light having a wavelength range if the antireflective film is made with a few dielectric thin films. Many dielectric thin films are needed to obtain the antireflective effect for light in a wide wavelength range. Also more dielectric thin films must be deposited to prevent reflectance from changing depending on an incident angle of light. Hence ten to twenty or more layers of the dielectric thin film are needed to satisfy required performance.

A vacuum evaporation method to form the dielectric thin films causes variation of thickness of the films, resulting in instability of performance. In addition, after molding a substrate to be an optical element in one process, the method needs another process to form the dielectric thin film on the surface of the substrate, thereby reducing yields and increasing costs.

Basically antireflective films cancel out reflective light through the use of interference of light. Due to this, a refraction index of materials and a thickness of each dielectric thin film need to be controlled with high accuracy in the process of producing the dielectric thin film, thereby increasing costs with an increase in number of the dielectric thin film to be deposited. In addition, the increase in number of the dielectric thin film causes warps or the like in the substrate of the optical element, thereby reducing yields.

Spectral characteristics of thin films are influenced by properties of materials of the thin films, especially by a refraction index. The refraction index varies according to conditions of the film formation. Besides, limitations in materials of the film make it difficult to obtain ideal spectral characteristics.

On the other hand, an optical substrate with protrusions in a pyramidal shape thereon would be effective. In order to obtain the antireflective effect for light having a wider wavelength range, it is preferable that an aspect ratio, which is a ratio of height to pitch P of the protrusions, is large. In a structure disclosed in JP 88001/1993A, however, it is difficult in principle to form pyramidal shapes with the aspect ratio of not less than one.

Also in a structure disclosed in JP 96902/1987A, there is a possibility that incident light is reflected diffusely because of irregular shapes of the protrusions, resulting in low efficiency.

JP 272505/2001A proposes a method for forming spindle shapes on a surface of an optical element to solve the above problems. A metallic mask is formed on the optical element in a dot array and the optical element is subjected to reactive ion etching. At this time, the optical element is etched until the metallic mask vanishes after the gradual reduction of the diameter of the mask.

Although a surface treatment method of which the spindle shape with a large aspect ratio is formed on the optical element is proposed in JP 272505/2001A, the process, forming the metallic mask of chromium (Cr), aluminum (Al) or the like on the optical element and subjecting the optical element to reactive ion etching until the metallic mask vanishes, becomes complicated with increase in cost.

The present invention has an object to provide an antireflective member with stability and a low reflectance at low cost by performing an antireflective treatment to the substrate in the molding process of the substrate.

SUMMARY OF THE INVENTION

The present invention comprises a transparent substrate having a roughened surface with a continuous pattern of a fine pyramidal shape or a fine conical shape. The roughened surface is a diffraction surface with the zeroth-order diffraction to visible light. The pattern of the roughened surface is transferred from a mold at the transfer rate of not less than 70%.

Here, the zeroth-order diffraction refers to light traveling straight; in other words, light is not diffracted at the surface. The transfer rate refers to a rate of the actual shape to the ideal shape.

Further, an aspect ratio of a protrusion in the continuous pattern of a fine pyramidal shape or a fine conical shape formed in the mold is not less than 1 in the present invention.

According to the above structure, stable spectral characteristics can be obtained by forming the antireflective pattern on the surface of the substrate in the molding process of the substrate. Besides, the antireflective member can obtain spectral characteristics with low reflectance over visible light range by forming with the transfer rate from the mold not less than 70% and setting the aspect ratio of the protrusion, which is in a continuous pattern of a fine pyramidal shape or a fine conical shape and formed in the mold, not less than 1.

Also a misuse prevention film such as an ITO film having dust-proof property and $TiO_2$ acting as photocatalyst may be provided on the roughened surface in the present invention.

In electronic equipment comprising an optical element in the present invention, the optical element includes a transparent substrate having a roughened surface with a continuous pattern of a fine pyramidal shape or a fine conical shape. The roughened surface is a diffraction surface with the zeroth-order diffraction to visible light. The pattern of the roughened surface is transferred from a mold at the transfer rate of not less than 70%.

The electronic equipment is a personal digital assistant and comprises a liquid crystal display device. The liquid crystal display device is a reflective type liquid crystal display device including a surface lighting device. The surface lighting device comprises a light source and a light guide plate and the roughened surface is formed on the light guide plate so as to face a reflective liquid crystal display means.

The roughened surface may be formed on a front cover of the liquid crystal display device.

Also the roughened surface may be formed on a cover of a lens of a CCD camera as the electronic equipment.

The electronic equipment may be an optical pickup device whose diffraction grating is provided with the roughened surface.

BRIEF DESCRIPTION OF THE DRAWINGS

FIG. 3A shows an ideal shape and FIG. 3B shows a shape of the pattern transferred from the mold;

The foregoing and other objects, features, aspects and advantages of the present invention will become more apparent from the following detailed description of the present invention when reviewed in conjunction with the accompanying drawings.

DESCRIPTION OF PREFERRED EMBODIMENTS

Figure 1:
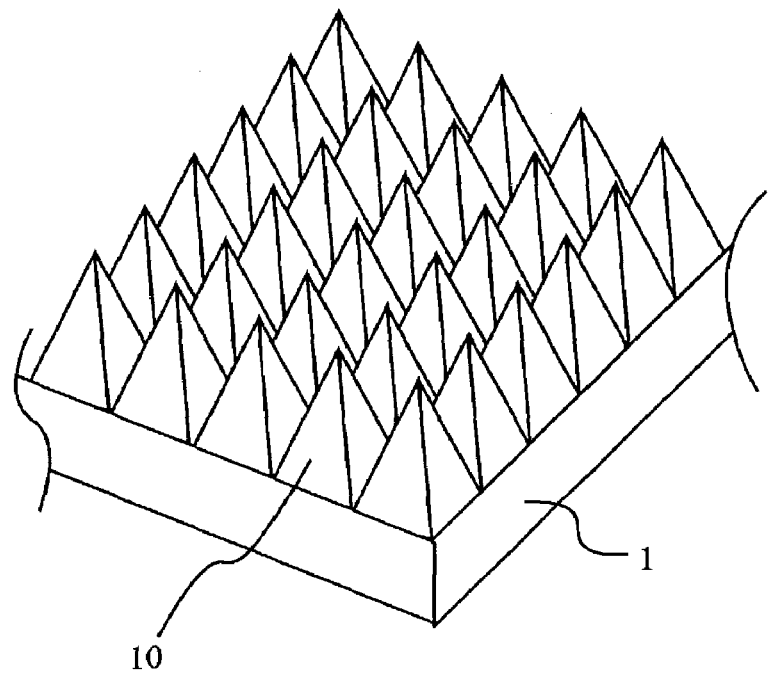
FIG. 1 is a perspective view showing a simplified shape of a surface of the antireflective member according to the present invention.
Figure 2:
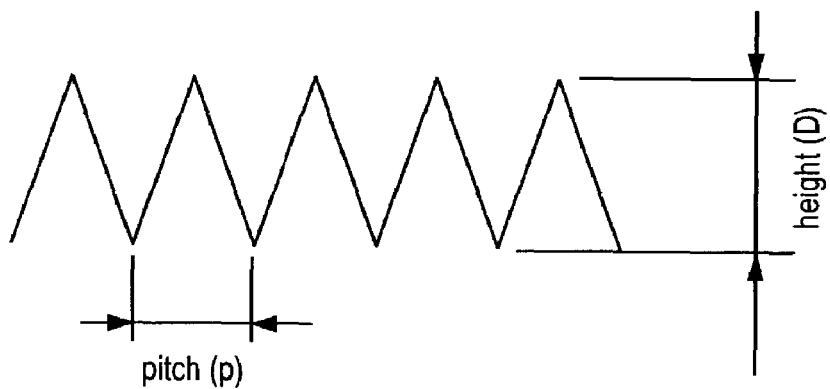
FIG. 2 is a schematic view showing a cross-sectional shape of the pattern.

Description of an embodiment according to the present invention is now made with reference to drawings. FIG. 1 is a perspective view showing a simplified shape of a surface of an antireflective member using this invention. FIG. 2 is a schematic view showing a cross-sectional shape of the pattern.

As shown in FIG. 1, a transparent substrate 1 comprises a roughened surface having a continuous pattern in which protrusions 10 in a fine pyramidal shape are continuously formed. Although the protrusion 10 takes the shape of pyramid in this embodiment, the present invention may employ protrusions in the shape of six-sided pyramid or in the shape of cone.

An aspect ratio is defined as a ratio D/p; a height D of the pattern to a pitch p of the pattern, shown in FIG. 2.

Figure 4:
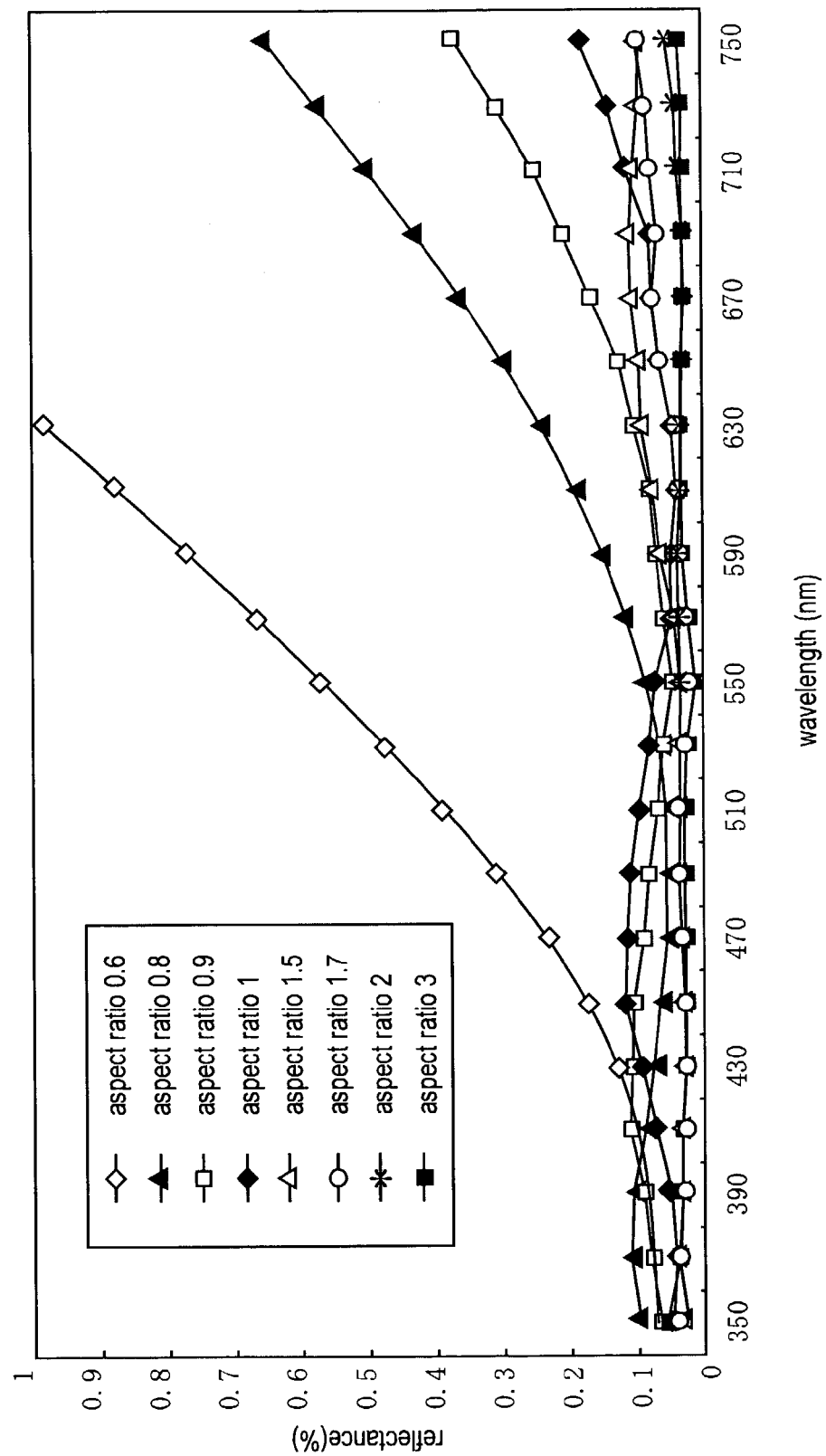
FIG. 4 shows a simulation result of spectral characteristics when changing an aspect ratio of the pyramid pattern.

FIG. 4 shows a simulation result of spectral characteristics when changing the aspect ratio of the pyramid pattern. Eight kinds of pyramid pattern having the aspect ratio respectively of 0.6, 0.8, 0.9, 1, 1.5, 1.7, 2, 3 are used to perform simulations. In all simulations, the pitch p of the pattern is fixed to 300 nm.

Spectral characteristics in FIG. 4 indicate that the reflectance of the patterns with the aspect ratio of smaller than 1 increases as the wavelengths become longer. The spectral characteristic of the pattern with the aspect ratio of 1 has its peak and bottom; the peak is seen around 470 nm and the bottom is seen around 620 nm, which means the spectral characteristic has a good balance.

The larger aspect ratio makes the peak and bottom of the spectral characteristic unclear, causing low reflectance; therefore interference colors generated by reflection are becoming nearly colorless.

On the other hand, while the reflectance of the pattern with the aspect ratio of smaller than 1 is increased on the long wavelength side, red component of the interference color is intensified. It is also found that the spectral characteristic loses balance when the aspect ratio is smaller than 1

Figure 3A:
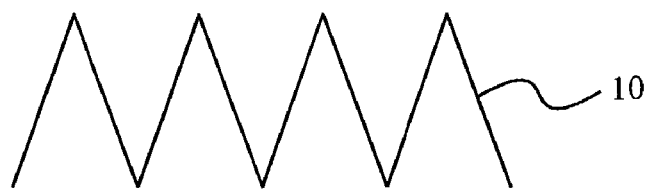
FIGS. 3A and 3B are schematic views showing a cross-sectional shape of the pyramid pattern.
Figure 3B:
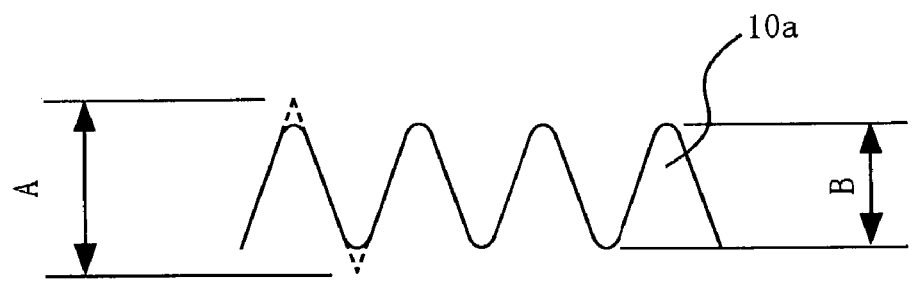

FIGS. 3A and 3B are schematic views showing a cross-sectional shape of the pyramid pattern. FIG. 3A illustrates the ideal shape of the pattern and FIG. 3B illustrates the actual shape of the pattern whose peaks and valleys become round after transfer from the mold. Here, a transfer rate is defined as a rate of the actual shape B to the ideal shape A in FIG. 3B.

Figure 5:
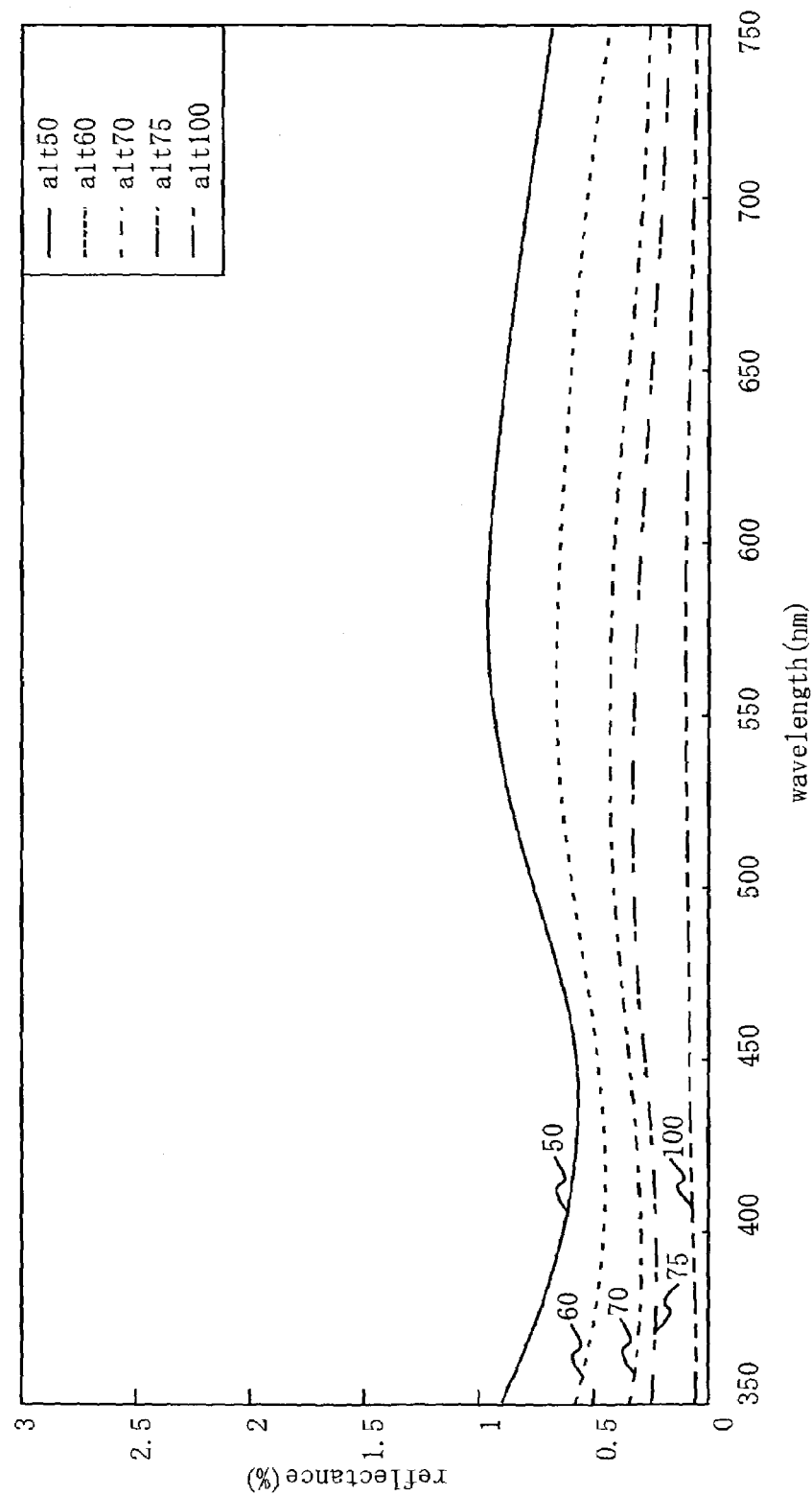
FIG. 5 shows a simulation result of spectral characteristics when changing a transfer rate of the pyramid pattern having an aspect ratio of 1.
Figure 6:
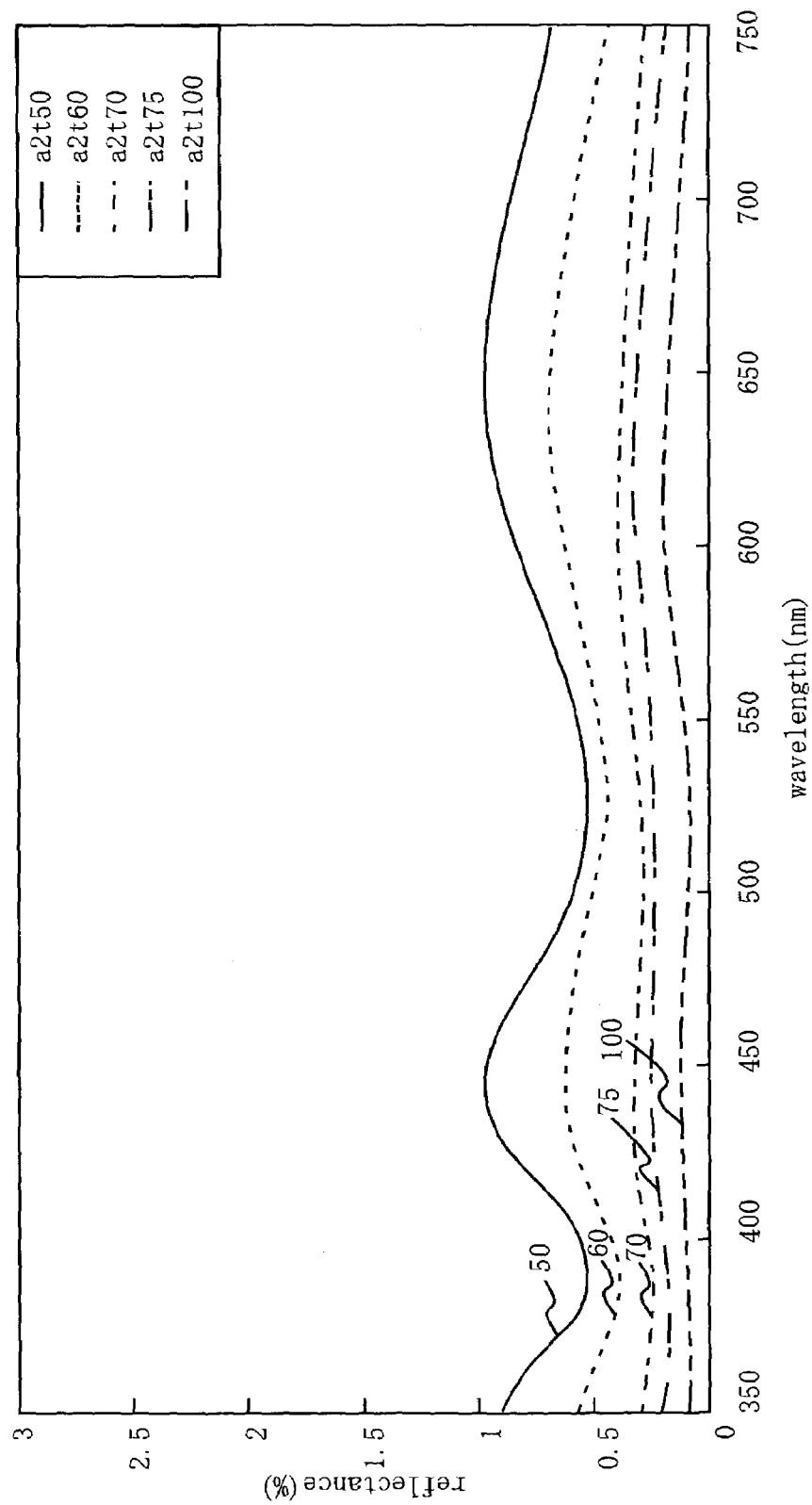
FIG. 6 shows a simulation result of spectral characteristics when changing a transfer rate of the pyramid pattern having an aspect ratio of 2.
Figure 7:
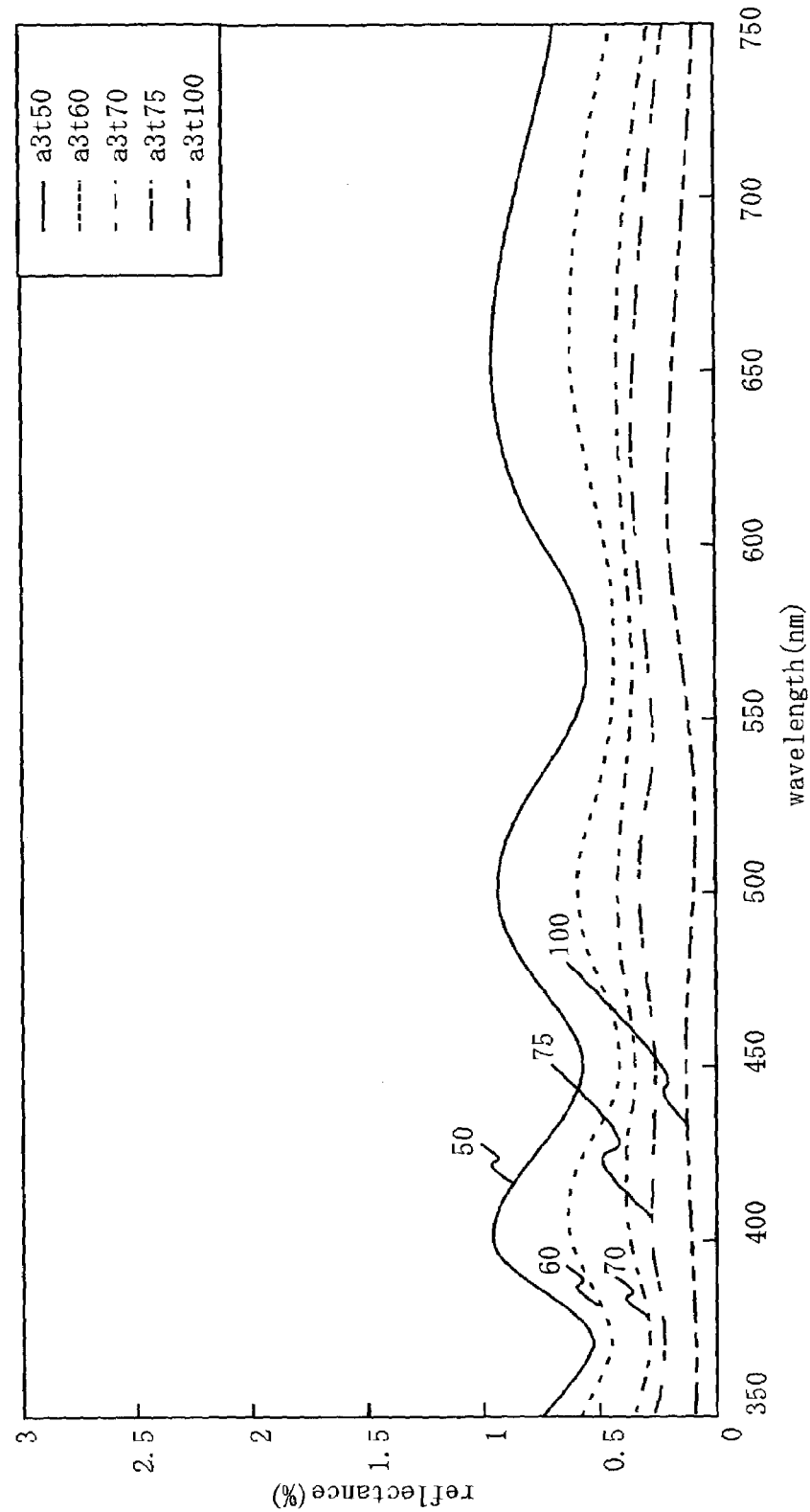
FIG. 7 shows a simulation result of spectral characteristics when changing a transfer rate of the pyramid pattern having an aspect ratio of 3.

FIGS. 5, 6 and 7 show simulation results of spectral characteristics when changing the transfer rate of the pyramid pattern. The aspect ratio of FIGS. 5, 6 and 7 are respectively 1, 2 and 3. In these Figures, the transfer rate of 100% means that the simulation was carried out with the pattern in the ideal shape.

In the spectral characteristics shown in FIGS. 5, 6 and 7, reflectance becomes higher with the declining transfer rate and peaks and bottoms can be seen. When the transfer rate is lower than 70%, the peaks and bottoms appear, especially the peaks and bottoms become noticeable with an increase in the aspect ratio. As can be appreciated, the transfer rate may be preferably 70% regardless of the aspect ratio, more preferably not less than 75%. By defining the transfer rate in this manner, the spectral characteristics can have a good balance.

A pitch p of the pattern should be smaller than a pitch of a wavelength of light. The pitch p is 300 nm in this embodiment. When the pitch p of the pattern is closer to wavelengths of visible light, for example 550 nm, a diffraction phenomenon of light occurs. Light diffraction loses inherent antireflective effect. When the pitch p of the pattern is smaller than wavelengths of visible light, light is not diffracted, which is so called zeroth-order diffraction. Consequently the continuous pattern on the surface of the transparent substrate 1 is formed so as to be a diffraction surface with zeroth-order diffraction to visible light.

Such pattern of pyramidal shape provided on the surface as the antireflective member might adhere dust on its patterned surface. To prevent this, ITO film having dust-proof property for the roughened surface or $TiO_2$ acting as photocatalyst may be provided on the roughened surface as a misuse prevention film.

As described above, the pitch p of the pattern is preferably smaller than a wavelength of light. In this embodiment, the pitch p is 300 nm. The smaller the pitch is, the more difficult molding of the pattern becomes. In consideration of molding or the like, the pitch p is preferably from 100 nm to 300 nm. The smallest pitch of a recent semiconductor is known as 100 nm. For a laser light source of an exposure system, research has been done on F2 laser with a wavelength λ in the 100 nm range, specifically λ=157 nm. A processing accuracy and resolution depends on the wavelength λ. Therefore, the smallest pitch p of the fine pattern should be 100 nm and more.

Descriptions will be made on an example of manufacturing methods of a mold for forming the above mentioned antireflective member with reference to FIGS. 8A to 8F and FIGS. 9A, 9B. First, a substrate to be a master of the antireflective member is formed as shown in FIGS. 8A to 8F.

Figure 8A:
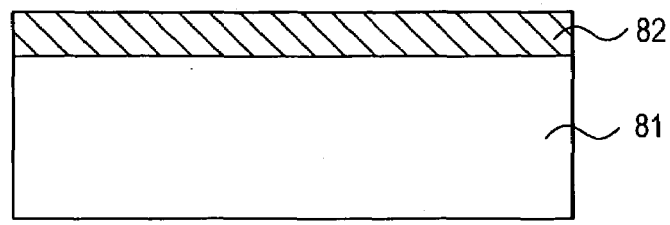
FIGS. 8A to 8F are schematic cross sectional views showing each manufacturing process of a substrate which will be a master of the antireflective member according to the present invention.

In FIG. 8A, an upper surface of a substrate 81 made of quartz, heat-resistance glass or the like is coated with a positive photoresist 82 of about 3000 angstrom in thickness by spin coating. Then, circles each having 125 nm in diameter placed at pitch of 250 nm are lithographed by performing electron beam exposure, two-beam interferometric exposure etc.

Figure 8B:
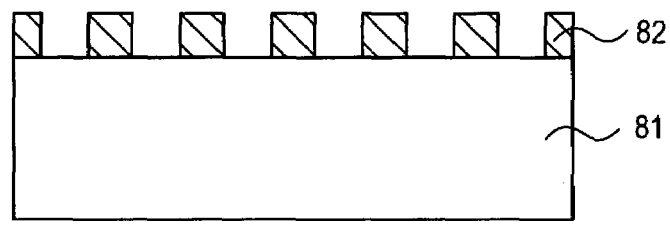
Figure 8C:
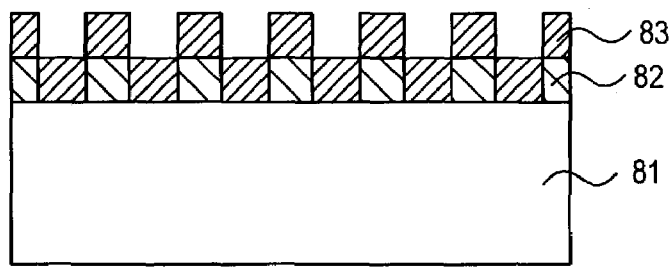
Figure 8D:
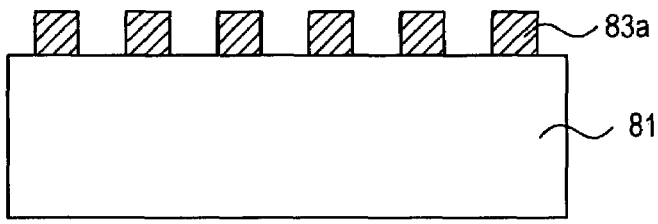

Next, portions which were exposed are removed after development to form the roughened photoresist 82 on the substrate, as shown in FIG. 8B. FIG. 8C shows a metal layer 83 formed by evaporating metal such as chromium (Cr) and aluminum (Al) onto the photoresist 82 and the substrate 81. This metal layer 83 is evaporated in a thickness about 500 angstrom and deposited on the photoresist 82 and the substrate 81 where the photoresist 82 was removed. After the photoresist 82 is lifted-off to remove, as shown in FIG. 8D, only metal layer 83 remains. The metal layer 83 is used as metal masks 83a, which are arranged in a dot array when viewing from above.

Figure 8E:
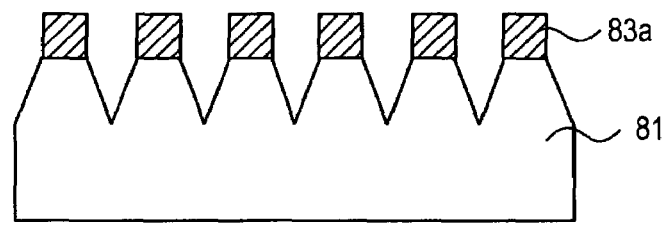
Figure 8F:
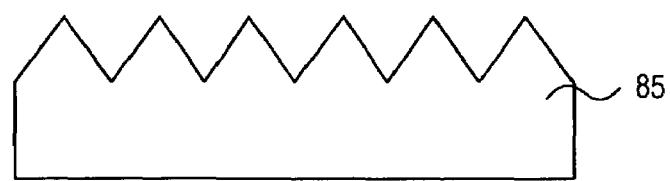

The pitch between the metal masks 83a is adjusted in a range between 100 nm and 300 nm. Reactive ion etching is performed using the metal masks 83a as masks. As shown in FIG. 8E, the metal masks 83a are etched together with the substrate 81. With advance of etching the diameter of the metal mask 83a decreases. After keeping to etch until the metal masks 83a disappear, cones appear on the substrate as shown in FIG. 8F. The substrate 81 in which fine pattern functioning as antireflective member is formed thereon is now referred as master 85.

Figure 9A:
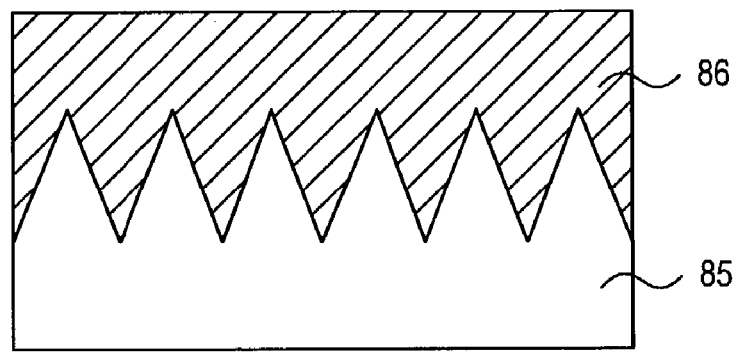
FIGS. 9A to 9B are schematic cross sectional views showing each manufacturing process of a mold with a use of the master substrate of the antireflective member according to the present invention.
Figure 9B:
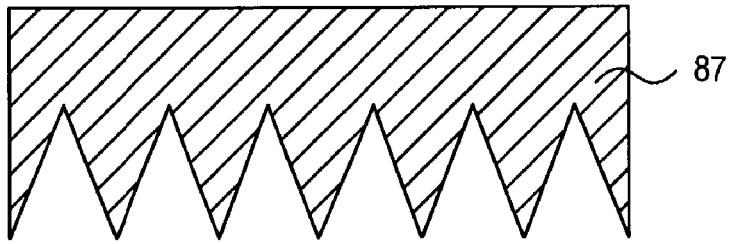

Subsequently nickel (Ni) is sputtered on the master 85 to form a nickel layer of a few hundreds angstrom in thickness as shown in FIG. 9A. Then plating is given to form a metal layer 86 of from a few hundreds μm to a few mm by using the nickel layer as electrodes. After removing the metal layer 86 a mold 87 in FIG. 9B is completed. To prevent damages to the fine pattern upon removing the metal layer 86, conditions for plating are optimized. If necessary, the mold 87 may be bonded to a metal base to reinforce. A mold for forming the antireflective member of the present invention is obtained in this manner.

Methods of forming the antireflective member with the above mold include a 2P (photo-polymer) molding process using a UV cure resin, a hot press molding process, a resin injection molding process, which will be described later. Experimental results show the transfer rate of each process: the 2P molding process, at lowest 90%; the hot press molding process, 80–90%; and the injection molding process, at highest 70%.

Figure 10:
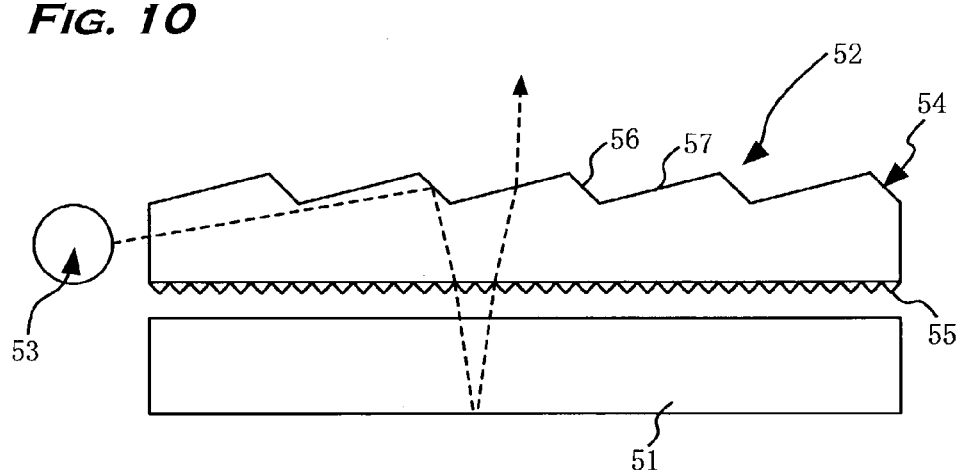
FIG. 10 is a schematic cross sectional view of lighting device using a light guide plate adopting the present invention.

Next, description is made on a specific example adopting the antireflective member of the present invention. FIG. 10 is a schematic view of a light guide plate, which is used for a surface light source device in a reflective type liquid crystal display device, adopting the present invention.

As shown in the schematic cross sectional view of FIG. 10, a surface lighting device 52 is arranged beside a reflective type liquid crystal display means 51 as a front light. The lighting device 52 comprises a linear light source 53, a light guide plate 54 and an antireflective member 55 which is provided on a back surface of the light guide plate 54 so as to face the reflective type liquid crystal display means 51 in order to enhance visibility. The antireflective member 55, as described later, is integrally formed with the light guide plate 54. The antireflective member 55 consists of a roughened surface in which protrusions, for example having a pitch p of 300 nm and an aspect ratio of 1, are continuously formed.

The protrusion can be made to be smaller from its bottom toward its top (light incident side) so that a refraction index is distributed.

Although a linear light emission tube is sometimes used as a linear light source 53, the more frequently used linear light source is a combination of a point source of light such as a light emitting diode and a linear or bar-like light guide plate which scatters and emits light from the point source in order to reduce power consumption.

On the front surface of the light guide plate 54, reflective surfaces 56 and light transmitting surfaces 57 are alternately provided; the reflective surfaces 56 scatter light entered from the linear light source 53 through one side of the light guide plate 54, namely light incident surfaces, and reflect the light toward the back surface; and light transmitting surfaces 57 allow light, which is reflected by the liquid crystal display means 51 and enters the back surface of the light guide plate 54, to transmit toward the front surface side of the light guide plate 54.

Light emitted from the linear light source 53 is reflected on the reflective surfaces 56 of the light guide plate 54 and enters the liquid crystal display means 51. After converted and reflected in the liquid crystal display means 51, the light enters the light guide plate 54 without being reflected due to the antireflective member 55. The visible light among the light enters the light guide plate 54 without being refracted. Then the light transmitted from the light guide plate 54 is visually identified.

Figure 11:
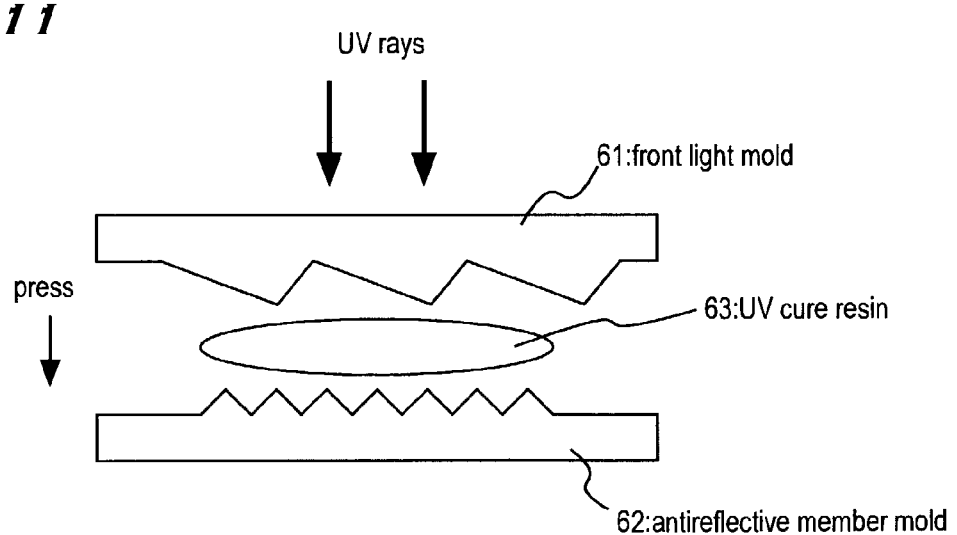
FIG. 11 is a schematic cross sectional view showing a method for producing the light guide plate adopting the present invention.

Descriptions are made on one method for forming the above mentioned light guide plate by referring to FIG. 11. The method shown in FIG. 11 is a 2P (photo-polymer) molding process using a UV cure resin. First, the following are prepared: a front light mold 61 comprising a pattern to form reflective surfaces and light transmitting surfaces on the front side of the light guide plate that composes the front light; and an antireflective member mold 62 having a continuous pattern to form the antireflective member 55. The front light mold 61 is made of transparent materials.

A UV cure resin 63 is charged between the molds 61 and 62, pressurized and then cured by irradiation of ultraviolet rays (UV). Later, the antireflective member 55 is integrally formed with the light guide plate 54 after taking off the molds 61 and 62.

According to the above mentioned method, the pattern of the antireflective member 55 can be transferred from the mold at an extremely high transfer rate.

Figure 12:
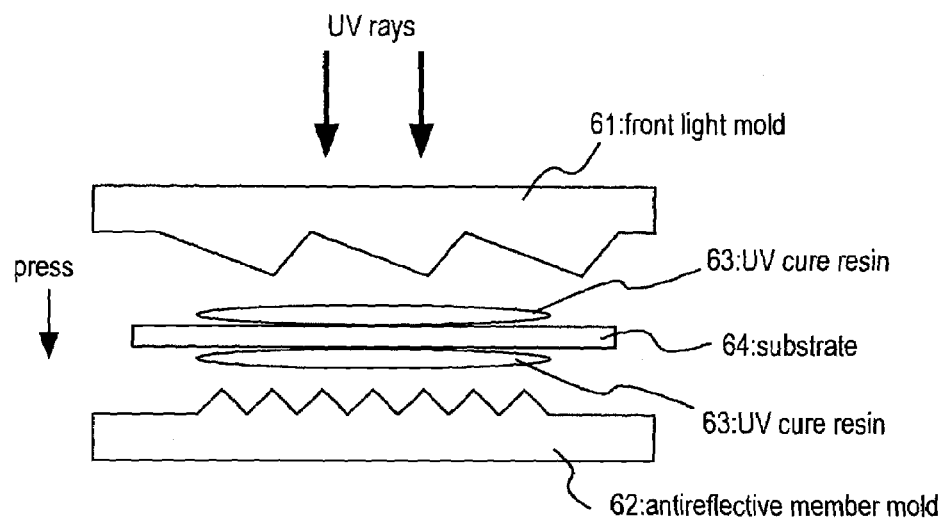
FIG. 12 is a schematic cross sectional view showing another method for producing the light guide plate adopting the present invention.

Descriptions are made on another method for forming the above mentioned light guide plate by referring to FIG. 12. The method shown in FIG. 12 is also a 2P (photo-polymer) molding process using a UV cure resin. First, the following are prepared; a front light mold 61 comprising a pattern to form reflective surfaces and light transmitting surfaces on the front side of the light guide plate that composes the front light; and an antireflective member mold 62 having a continuous pattern to form the antireflective member 55. The front light mold 61 is made of transparent materials.

Next, a transparent substrate 64 is put between the molds 61 and 62. A UV cure resin 63 is charged on both sides of the transparent substrate 64, pressurized and cured by irradiation of ultraviolet rays (UV). Later, the light guide plate is integrally formed with the antireflective member 55 and the pattern surface of the front light formed on each side of the transparent substrate 64 after taking off the molds 61 and 62.

According to the above method, the pattern can be transferred from the mold at an extremely high transfer rate.

Figure 13:
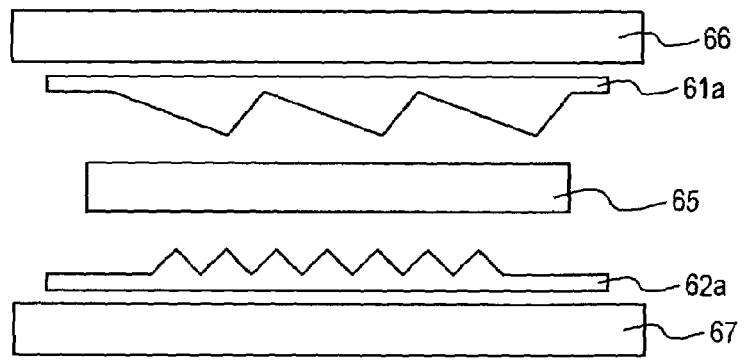
FIG. 13 is a schematic cross sectional view showing other method for producing the light guide plate adopting the present invention.

Descriptions are made on other method for forming the above mentioned light guide plate by referring to FIG. 13. The method shown in FIG. 13 is a hot press molding process. First, the following are prepared; a front light mold 61a comprising a pattern to form reflective surfaces and light transmitting surfaces on the front side of the light guide plate that composes the front light; and an antireflective member mold 62a having a continuous pattern to form the antireflective member 55. Next, the both molds 61a and 62a are held respectively by pressure plates 66 and 67. Each pressure plate 66 and 67 includes a heater to heat the molds 61a and 62a to a predetermined temperature (not shown). Placed between the molds 61a and 62a is a transparent substrate 65 which is made of materials for hot press process, such as an acryl resin (PMMA [polymethyl methacrylate]). The molds 61a, 62a are heated to a glass transition temperature of the transparent substrate 65. In this example, the upper mold 61a and the lower mold 62a are maintained at temperatures from 150 to 180° C. The transparent substrate 65 then is pressured and cooled down to cure and the pattern of the molds 61a and 62a is transferred to the transparent substrate 65, thereby obtaining a light guide plate.

Figure 14A:
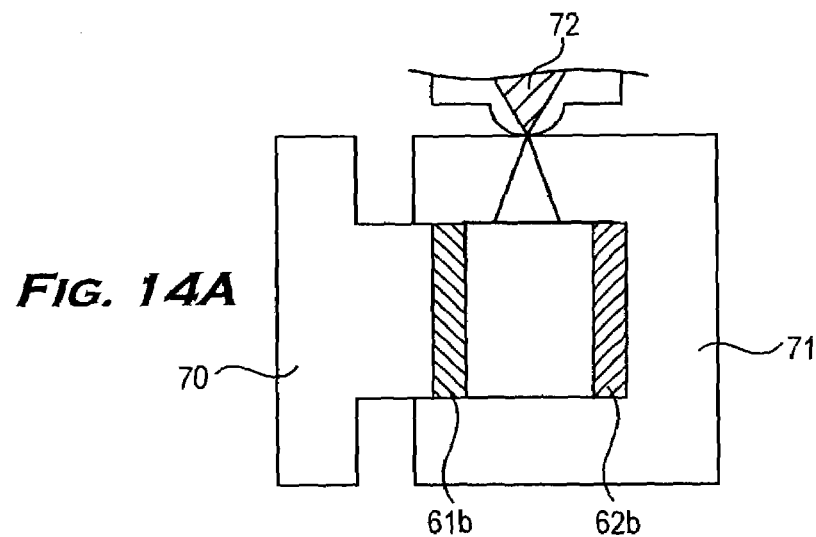
FIGS. 14A to 14C are schematic cross sectional views showing other additional method for producing the light guide plate adopting the present invention.
Figure 14B:
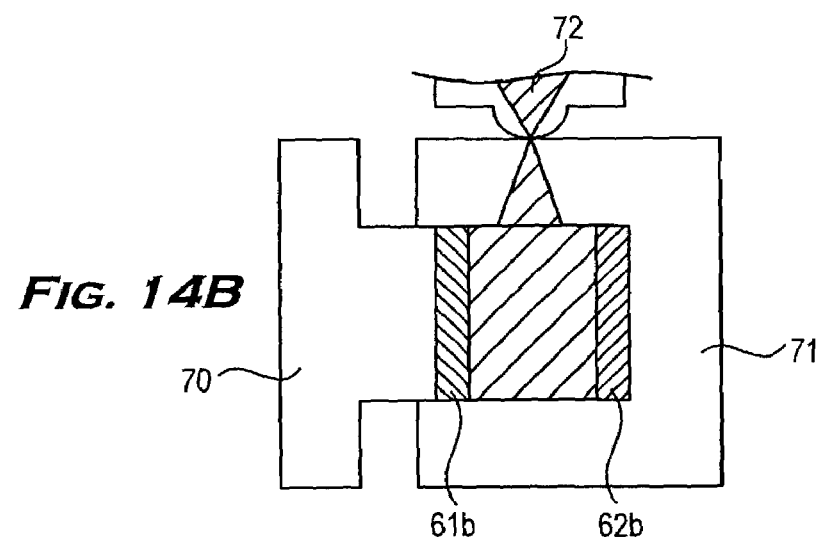
Figure 14C:
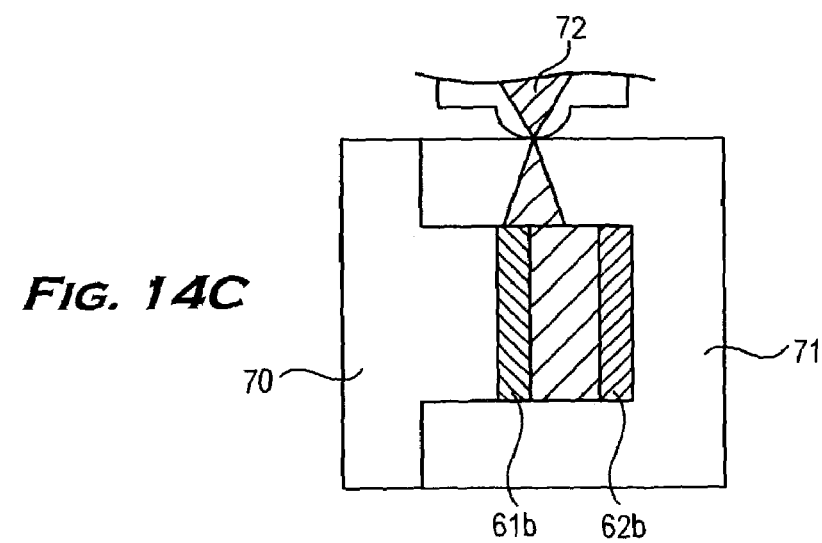

Descriptions are made on other additional method for forming the above mentioned light guide plate by referring to FIGS. 14A to 14C. The method shown in FIGS. 14A to 14C is an injection molding process. First, the following are prepared; a front light mold 61b comprising a pattern to form reflective surfaces and light transmitting surfaces on the front side of the light guide plate that composes the front light; and an antireflective member mold 62b having a continuous pattern to form the antireflective member 55. As shown in FIG. 14A, the mold 61b and 62b are fixed respectively to a moving base 70 and a fixed base 71 of an injection molding machine to make a cavity. In FIG. 14B a substrate material such as a plasticized acrylic resin (PMMA) is charged into the cavity. By compressing the cavity to mold as shown in FIG. 14C a light guide plate with the pattern transferred from the molds 61b, 62b is obtained. Materials used for the substrate include an acrylic or polycarbonate transparent resin, specifically; single or polymer of acrylate ester such as polymethyl methacrylate and polymethyl acrylate and methacrylate ester; polyester such as polyethylene terephthalate and polybutylene terephthalate; thermoplastic resin such as polycarbonate and polystyrene and polymethylpentene; acrylate cross-linked by ultra-violet rays or electron rays such as polyfunctional urethane acrylate and polyester acrylate; transparent resin such as saturated polyester; transparent glass; transparent ceramic.

This invention is applicable to not only the above mentioned light guide plate but also various optical devices below; a spherical part of a lens such as an object lens for an optical pickup; diffraction gratings; semiconductor laser; a cover glass of LED; a resin cover of a liquid crystal display surface and a touch panel of PDA (Personal Digital Assistant) devices such as a cellular phone; a light incident surface of solar cell devices or the like.

Figure 15:
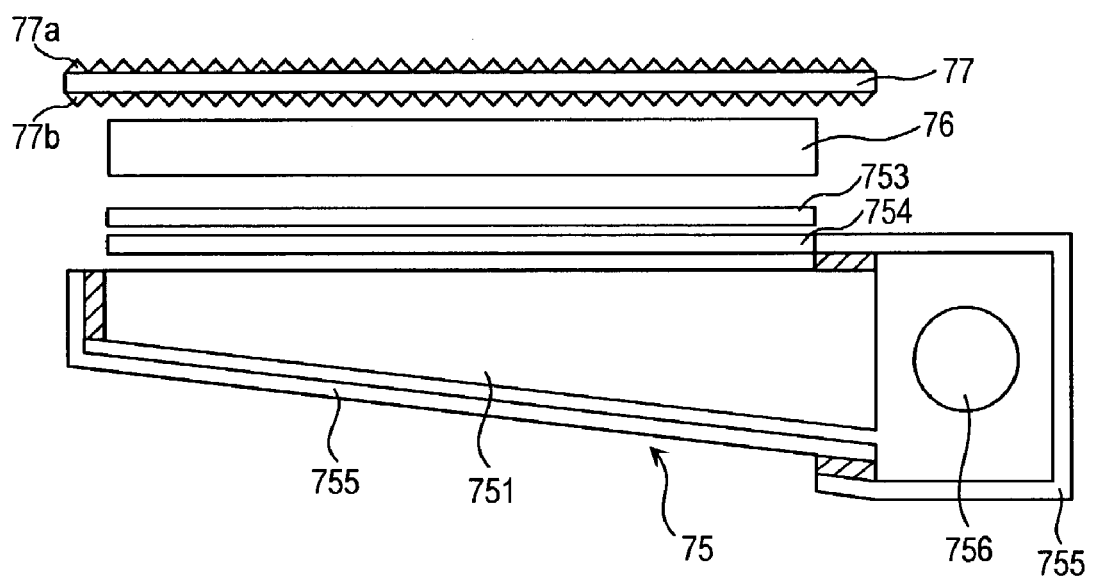
FIG. 15 is a schematic view of an example of which the antireflective member of the invention is applied to a front cover of a transmission type liquid crystal display device.

FIG. 15 is a schematic view of an example which the antireflective member of the invention is applied to a front cover of a transmission type liquid crystal display device. The schematic view of FIG. 15 shows that a transmission type liquid crystal panel 76 is arranged on the light irradiation side of the lighting device 75 of a backlight. Arranged above the transmission type liquid crystal panel 76 is a front cover 77, made of a transparent resin, of which antireflective members 77a and 77b of the present invention are provided respectively on a front surface and a rear surface. In the lighting device a linear light source 755 is arranged on one side of the light guide plate 751 and a reflective case 756, the light guide plate 751, a lens sheet 753 and 754 are deposited in this order. The linear light source 752 is surrounded by a reflector 755. If the transmission type liquid crystal display device of such structure comprises the antireflective member 77a and 77b according to the present invention on both sides of the front cover 77, the liquid crystal panel 76 can transmits visually recognizable image light without unnecessary reflection.

Figure 16:
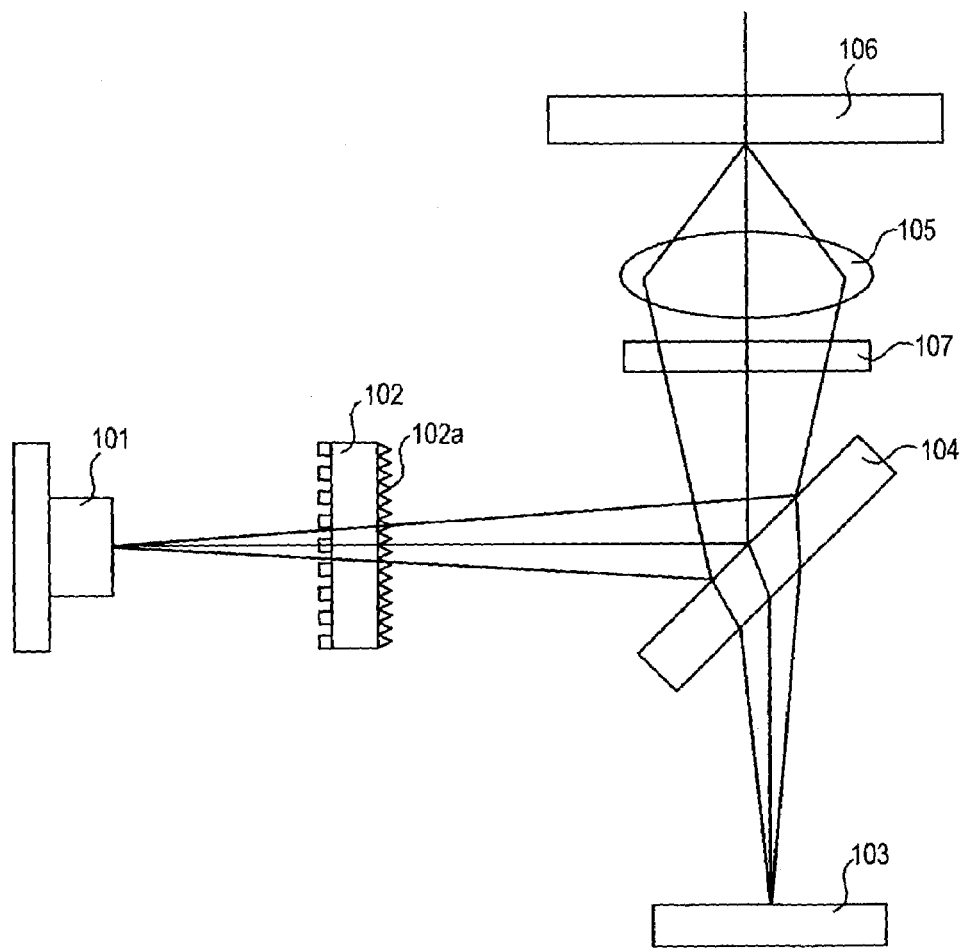
FIG. 16 is a schematic view of an example of which the antireflective member of the invention is applied to a diffraction grating of an optical pickup.

FIG. 16 is a schematic view of an example which the antireflective member of the invention is applied to a diffraction grading of an optical pick-up. Laser light emitted from a laser diode 101 passes through a diffracting grading 102 and is divided into a main spot of light for reading information in a disc 106 and two side spots of light emerging on both sides of the main spot of light. The antireflective member 102a of this invention is provided on the light emitting side of the diffraction grating 102. The spots of light divided by the diffraction grating 102 are reflected by a polarizing beam splitter 104 and irradiated to the disc 106 through a ¼ wavelength plate 107 and an objective lens 105 which brings the spots of light into focus. The light reflected by the disc 106 travels to a detector 103 through the objective lens 105, the ¼ wavelength plate 107 and the polarizing beam splitter 104 and a detector 103 reads information of the light. Also the objective lens 105 may adopt the antireflective member of this invention.

Figure 17A:
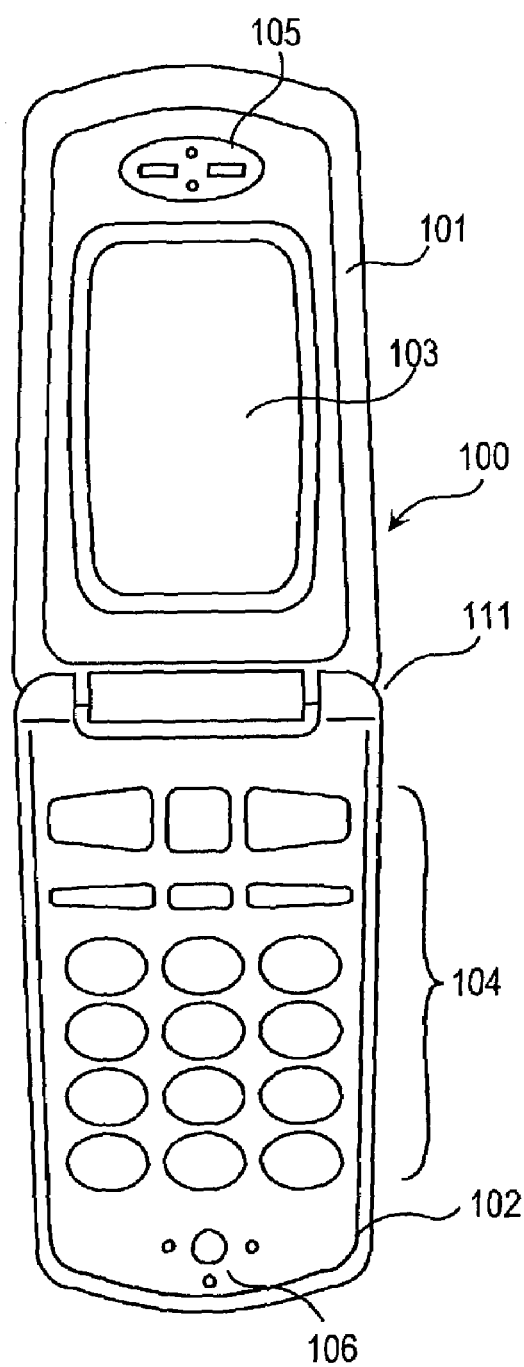
FIGS. 17A and 17B are respectively a front view and a rear view showing a cellular phone, as an example, in which the antireflective member of the invention is provided on a resin cover of a liquid crystal display surface and on a lens of a CCD camera.
Figure 17B:
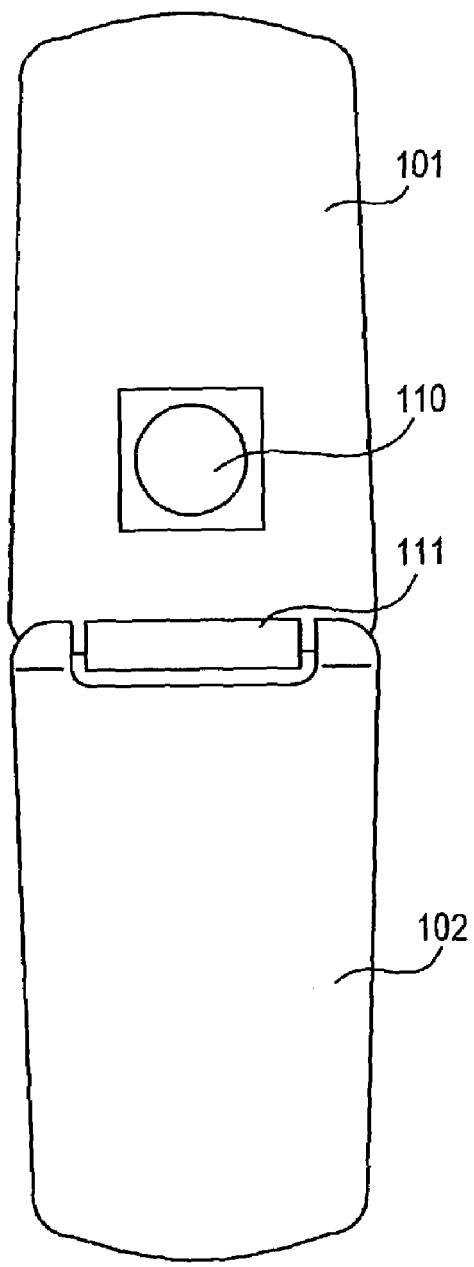

FIGS. 17A and 17B show an example which the antireflective member of the invention is applied to a resin cover of a liquid crystal display surface and a lens of a CCD camera of a cellular phone. FIG. 17A is a front view of a cellular phone 100 employing the antireflective member of this invention and FIG. 17B is a rear view thereof. The cellular phone 100 consists of a first body 101 having a liquid crystal display 103 and a speaker 105 and a second body 102 having a pushbutton operation section 104 and a microphone 106, and is designed so as to fold in two through a hinge 111. On the resin cover of the liquid crystal display 103, the antireflective member can be provided as in a case of the front cover shown in FIG. 15. Similarly the antireflective member is provided on a lens cover of the CCD camera 110 arranged on a backside of the first body 101.

According to the present invention, as can now be appreciated, good yield and stable spectral characteristic can be obtained by forming the antireflective pattern on the surface of the substrate while forming the substrate.

Although the present invention has been described and illustrated in detail, it should be clearly understood that the description discloses examples of different embodiments of the invention and is not intended to be limited to the examples or illustrations provided. Any changes or modifications within the spirit and scope of the present invention are intended to be included, the invention being limited only by the terms of the appended claims.

We claim:

1. A method for forming an antireflective member comprising:
    forming, on a surface of a mold, a roughened surface in a continuous pattern of a fine pyramidal shape or a fine conical shape, wherein protrusions of the roughened surface formed on the surface of the mold have an aspect ratio of not less than 1.0; and
    transferring the pattern of the roughened surface from the mold to a surface of a transparent substrate at a transfer rate of not less than 70% by a 2P (photo-polymer) molding process to form the roughened surface in the continuous pattern of the fine pyramidal shape or the fine conical shape on the surface of the transparent substrate such that protrusions of the roughened surface formed on the transparent substrate have an aspect ratio of not less than 0.7,
    wherein a pitch of the continuous pattern of the roughened surface is between 100 nm and 300 nm, and the roughened surface is a diffraction surface with zeroth-order diffraction with respect to visible light.

2. The method for forming an antireflective member of claim 1, further comprising forming a misuse prevention film for preventing physical abuse of the antireflective member on the roughened surface.

3. A method for forming electronic equipment comprising an optical element, the method comprising:
    forming, on a surface of a mold, a roughened surface in a continuous pattern of a fine pyramidal shape or a fine conical shape, wherein protrusions of the roughened surface formed on the surface of the mold have an aspect ratio of not less than 1.0; and
    transferring the pattern of the roughened surface from the mold to a surface of a transparent substrate of the optical element at a transfer rate of not less than 70% by a 2P (photo-polymer) molding process to form the roughened surface in the continuous pattern of the fine pyramidal shape or the fine conical shape on the surface of the transparent substrate such that protrusions of the roughened surface formed on the transparent substrate have an aspect ratio of not less than 0.7,
    wherein a pitch of the continuous pattern of the roughened surface is between 100 nm and 300 nm and the roughened surface is a diffraction surface with zeroth-order diffraction with respect to visible light.

4. The method for forming electronic equipment of claim 3, wherein the electronic equipment is a personal digital assistant and comprises a liquid crystal display device.

5. The method for forming electronic equipment of claim 4, wherein the liquid crystal display device is reflective type liquid crystal display device comprising a surface lighting device, and the surface lighting device comprises a light source and a light guide plate, the method further comprising:
    forming the roughened surface on the light guide plate so as to face a reflective type liquid crystal display means.

6. The method for forming electronic equipment of claim 4, wherein the roughened surface is formed on a front cover of the liquid crystal display device.

7. The method for forming electronic equipment of claim 3, wherein the electronic equipment is a CCD camera and the roughened surface is provided on a lens cover of the camera.

8. The method for forming electronic equipment of claim 3, wherein the electronic equipment is an optical pickup device, and the roughened surface is provided on a diffraction grating of the optical pickup device.

9. The method for forming an antireflective member of claim 1, further comprising using a UV cure resin in the 2P molding process.

10. A method of forming an antireflective member, the method comprising:
    forming, on a surface of a mold, a roughened surface in a continuous pattern of a fine pyramidal shape or a fine conical shape, wherein protrusions of the roughened surface formed on the surface of the mold have an aspect ratio of not less than 1.0; and
    transferring the pattern of the roughened surface from the mold to a surface of a transparent substrate at a transfer rate of not less than 70% by a 2P molding process or an injection molding process, both using a resin, to form the roughened surface in the continuous pattern of the fine pyramidal shape or the fine conical shape on the surface of the transparent substrate such that protrusions of the roughened surface formed on the transparent substrate have an aspect ratio of not less than 0.7, wherein a pitch of the continuous pattern of the roughened surface is between 100 nm and 300 nm and the roughened surface is a diffraction surface with zeroth-order diffraction with respect to visible light.

11. The method for forming an antireflective member of claim 10, further comprising forming a misuse prevention film for preventing physical abuse of the antireflective member on the roughened surface.

12. A method for forming electronic equipment comprising an optical element, the method comprising:

forming, on a surface of a mold, a roughened surface in a continuous pattern of a fine pyramidal shape or a fine conical shape, wherein protrusions of the roughened surface formed on the surface of the mold have an aspect ratio of not less than 1.0; and transferring the pattern of the roughened surface from the mold to a surface of a transparent substrate of the optical element at a transfer rate of not less than 70% by a 2P molding process or an injection molding process, both using a resin, to form the roughened surface in the continuous pattern of the fine pyramidal shape or the fine conical shape on the surface of the transparent substrate such that protrusions of the roughened surface formed on the transparent substrate have an aspect ratio of not less than 0.7, wherein a pitch of the continuous pattern of the roughened surface is between 100 nm and 300 nm and the roughened surface is a diffraction surface with zeroth-order diffraction with respect to visible light.

13. The method for forming electronic equipment of claim 12, wherein the electronic equipment is a personal digital assistant and comprises a liquid crystal display device.

14. The method for forming electronic equipment of claim 13, wherein the liquid crystal display device is reflective type liquid crystal display device comprising a surface lighting device, and the surface lighting device comprises a light source and a light guide plate, the method further comprising:

forming the roughened surface on the light guide plate so as to face a reflective type liquid crystal display means.

15. The method for forming electronic equipment of claim 13, wherein the roughened surface is formed on a front cover of the liquid crystal display device.

16. The method for forming electronic equipment of claim 12, wherein the electronic equipment is a COD camera and the roughened surface is provided on a lens cover of the camera.

17. The method for forming electronic equipment of claim 12, wherein the electronic equipment is an optical pickup device, and the roughened surface is provided on a diffraction grating of the optical pickup device.

* * * * *